United States Patent [19]
Harris

[11] Patent Number: 5,677,784
[45] Date of Patent: Oct. 14, 1997

[54] ARRAY OF PELLICLE OPTICAL GATES

[75] Inventor: Ellis D. Harris, Claremont, Calif.

[73] Assignee: Ellis D. Harris Sr. Family Trust, Claremont, Calif.

[21] Appl. No.: 506,011

[22] Filed: Jul. 24, 1995

[51] Int. Cl.⁶ .................................................. G02B 26/00
[52] U.S. Cl. ........................... 359/290; 359/291; 359/296; 359/601; 359/298
[58] Field of Search ................................ 359/290, 291, 359/292, 296, 316, 318, 885, 601, 609, 298; 372/50; 353/122, 42

[56] References Cited

U.S. PATENT DOCUMENTS

| | | | |
|---|---|---|---|
| 4,772,096 | 9/1988 | Kai et al. | 359/601 |
| 4,786,149 | 11/1988 | Hoening et al. | 359/290 |
| 4,877,308 | 10/1989 | Okuno et al. | 359/601 |
| 4,919,521 | 4/1990 | Tada et al. | 359/296 |
| 5,147,716 | 9/1992 | Bellus | 359/296 |
| 5,189,554 | 2/1993 | Vanasse et al. | 359/601 |
| 5,204,772 | 4/1993 | Hirata et al. | 359/296 |
| 5,210,645 | 5/1993 | Orino et al. | 359/601 |
| 5,287,215 | 2/1994 | Warde et al. | 359/298 |
| 5,296,974 | 3/1994 | Tada et al. | 359/296 |
| 5,368,780 | 11/1994 | Tojima et al. | 359/296 |
| 5,463,492 | 10/1995 | Check, III | 359/296 |

*Primary Examiner*—Loha Ben

[57] ABSTRACT

An array of pellicle optical gates may be utilized as a real time, thin film, flat panel display. At an element pitch typical of the pixel pitch of a representative laser printer, the display may emulate a page of data as printed by a laser printer but with the capability of real time editing and with the additional capabilities of data retention when removed from the source and electronic recovery of the retained data. A plurality of the arrays may emulate a plurality of printed pages wherein a multi-page document may be made available. A similar array may be utilized as a light gate in an image projection system.

19 Claims, 8 Drawing Sheets

ARRAY OF PELLICLE OPTICAL GATES

CROSS REFERENCE TO RELATED APPLICATION

This application contains subject matter that is related to subject matter of patent application Ser. No. EDH/95001 filed contemporaneously and herein incorporated by reference.

BACKGROUND OF THE INVENTION

This invention relates to an array of optical gates, and more particularly, to an array of pellicle optical gates, wherein the visual appearance of each element of the array is dependent upon whether an optical path associated with a pellicle is blocked by the pellicle or whether a cavity associated with a pellicle is covered or uncovered by the pellicle and wherein the pellicles are positioned in response to externally supplied signals. This invention additionally relates to an array of micro-pellicles wherein each may cover or uncover an associated optical path or micro-cavity as determined by voltages supplied to an associated electrode set. This invention further relates to an array of such optical gates which may be linear, comprising one element in width and one or more elements in length. This invention additionally relates to an area array of optical gates which tile a surface which may be flat and which may also be rectangular containing M X N elements or which may contain elements arranged in some other pattern. This invention also relates to an array of optical gates which can function as an output display for electronically available images or text which may be available from an electronic source such as a computer or television. This invention in particular relates to an array of pellicle/cavity optical gates wherein the pellicle of each gate is positioned by electric fields due to voltages contained on electrodes within the associated cavity in such a manner as to cover or uncover the optical aperture of the cavity. This invention in addition relates to an electronic assembly connected to the electrode set wherein the electronic assembly will accept electrical power and also image and synchronization data from an external source or sources and generate voltages as needed for positioning the pellicles. This invention further relates to an array of pellicle controlled optical gates wherein the electronics may be integral with the array using thin film electronic technologies. This invention in particular relates to an array of optical gates which can function under ambient illumination, wherein the array is neither self luminous nor requires a dedicated light source. This invention yet further relates to arrays of optical gates which may be arranged into stacks of arrays of optical gates wherein individual gates of the array and/or the stacks may optionally incorporate either a reflective cavity or a transmissive channel and in which different gates of the array or stack may, either singly or in combination, exhibit various colors or other optical or visual characteristics as determined by input signal.

A conducting gold leaf under the influence of electrostatic fields has been utilized as an electroscope or as an electrometer instrument to measure, both qualitatively and quantitatively, the presence and/or magnitude of an electric charge or an electrostatic field. Such instruments date back to almost the very beginning of studies of electric phenomena. If one electrode of a pair is a conducting plate fixed to a frame and the other electrode is an attached flexible gold leaf, then an electric charge applied to the electrode pair will generate electric fields causing the flexible electrode to be repelled from the fixed electrode. In one class of instruments the charge or field magnitude is related to the deflection relative to gravitational or other restoring force. In another class of instruments such magnitude can be related to the frequency of oscillation of a movable electrode under the influence of a spring restraint. An excellent discussion of electrometers and electroscopes is presented in "Procedures in Experimental Physics" by John Strong pp. 217–258 (Prentice-Hall, N.Y., 1938).

This invention relates to the physics of an electroscope using either a metal leaf such as gold, or a thin film conductive polymer such as polyaniline, or a conductive coated polymer such as nitrocellulose coated with a conductive, transparent coating such as Indium Tin Oxide or Polyaniline This invention also relates to such polymers into which an optical dye is embedded or onto which an optical dye is coated. Such dye could optionally be black, to block optical flux generally, or of a color such as cyan, yellow, magenta, red, green, blue, or other color to block selected spectral components of incident optical flux. In the particular intended application of this invention the visual appearance of a pellicle optical gate is modulated by the position of the pellicle. In the intended application of this invention either the reflectivity, in the case of a pellicle/cavity combination or the transmissivity, in the case of a pellicle/channel combination is modulated as the pellicle is caused to cover or uncover the cavity or channel under the influence of applied electric voltages.

A pellicle is a very thin polymer, plastic film, or membrane used commonly as a beam splitting component in optics and often utilized as an optical protective cover. Commercial pellicle beam splitters are available with thicknesses from 2 micrometers to 8 micrometers and thicker. They are available commonly in sizes up to 7 inches on an edge. Current technology permits consideration of sizes up to 16 inches. A typical substrate material is nitrocellulose and they are readily anti-reflection coated. An excellent discussion of pellicle technology is presented in "Solving Design Problems With Pellicles" by Milton J. Schwartz (Electro Optical System Design Aug., 1970 and reprinted by various pellicle vendors).

Electronic output display devices relate back to the Cathode Ray Tubes developed in conjunction with RADAR during the second world war and popularized with the advent of television. More recently a variety of displays have been developed and are under development. Often these prior art displays are self luminous, as in the case of an LED array or an electroluminescent screen. One class of such prior art displays include active or passive liquid crystal matrices and may include thin film transistor electronics to achieve an integrated flat panel display. Typically, dedicated light sources are required and often optical polarization filters are employed. With the use of polarization filters either a dedicated polarized light source must be used or a large efficiency penalty incurred as a result of polarization. In other prior art displays a dedicated light source is utilized in conjunction with a modulated membrane of mirror array. The power required along with the resultant waste heat load for either a self luminous display or a display needing a dedicated light source is a major drawback of prior art displays. This drawback is particularly serious in portable products or in products wherein a plurality of displays are desirable.

An additional type of prior art output display is the printed page. Dot matrix, Ink Jet and Laser Printers are commonly used to produce printed pages of data and/or images which may be available electronically. Such printed pages typically contain many more picture elements (pixels) than are available on CRT or other type of active displays. At a common resolution of 300×300 pixels an 8×10 inch format on paper there will be some 2400×3000 pixels. A frame of television, by contrast, consists of only about 525×525 pixels. High Definition Television, and high resolution computer displays are typically configured to have a resolution of 1024×1536. These prior art displays thus fall far short of the number of pixels available on a printed page. Commonly such prior art electronic displays are sufficiently bulky and power hungry that only a single display is utilized as an output. When large amounts of data must be displayed, as for instance when an author is working on a story and must have many pages available to tie the story together, the prior art electronic displays are unacceptable. Commonly such a document must be printed out for review. Editing in real time is cumbersome, and repeated printouts are often required. Such procedures have led to an explosion in the demand for paper and other consumables. They do not contribute to a "paperless" office. With the very large number of computers in use and a serious need for multi-page documents of high resolution for only temporary use, reliance upon throw-away paper documents results in an excessive costs and consumption of resources.

While Electrostatic phenomena were studied extensively during the earliest stages of electrical investigations, it has been electrodynamic phenomena which has dominated the electrical industries. A notable exception has been the advent of xerography, in which electrostatic forces are employed in printing images on plain paper. Related disciplines have matured since the introduction of xerography in the 1950's. Both black and colored toner particle and dye technologies are well established.

It has been demonstrated by prior art, in both xerography and offset printing that with black, cyan, yellow and magenta dyes a full color palette is available. With these dyes, a dye on dye approach can produce the additional colors of green, red or blue in a single pixel. Thus eight primary colors can be available for each pixel including: white, black, cyan, yellow, magenta, red, blue or green. The human eye perceives color at a resolution lower than its' resolution perception of brightness. Thus if a display is configured to match brightness resolution to the capability of human vision then adjacent colored pixels of the same resolution will merge into intermediate shades. As a result of this feature of human vision a very large number of hues and tints can be made available from the eight basic primary colors at the same time high resolution in brightness is achieved.

This invention particularly relates to thin, low power consuming, displays which may be of high resolution and which may emulate a printed page. By the means taught by this invention a number of such displays may be made available as an ensemble and the ensemble of such displays may emulate a book of many pages. As a result an entire multi-page document can be made available as "soft" output, that is, as a document available for immediate variation or editing under the control of an electronic host. Repeated paper printouts of such documents are not needed for review and/or editing. Multi-page information from a computer on-line service and/or a CD-ROM may be downloaded to a book emulating ensemble of displays for review at one's convenience. Such an ensemble may be used repeatedly. Both time and consumables may by these means be conserved. The low power requirement of displays employing techniques of this invention offer the added benefit that once a document is written to such an ensemble of displays, the material displayed can be maintained with very little power drain or waste-heat load. The power needed to maintain any single gate might typically match the power required to maintain the state of a single bit static RAM. Such a book-emulating-ensemble of displays might include a dedicated low capacity power supply, such as a battery and, once a document is written, might be disconnected from the data source and utilized very much as a book is used. The data displayed by the ensemble might then be recovered electronically by connecting the ensemble to an electronic device wherein the display may be addressed and recovered as electronic data. Re-connection to a data source would then allow the ensemble to be rewritten.

An array of transmission optical gates formed in accordance with this invention may function as a light gate in an image projection system. In this function it might emulate the film gate commonly used in cinema projection systems. With a dedicated projection lamp the array might serve for theater projection. The inherent high resolution capability of the array may allow high resolution projection from a electronic image source. The freedom from the constraints of a mechanical film projector, along with the ability of the array of pellicle optical gates to hold an image may allow individual frames to be grabbed for analysis and for special effects.

It is an object to this invention to provide an array of optical gates which may function as the array of pixels in a surface or a flat panel display and which may serve as an output medium for electronics supplied images or text.

It is an additional object of this invention to provide an array of optical wherein elements of the array may emulate the pixels in a typical laser printed document.

It is a further object of this invention to provide an array of pixel emulating optical gates which functions in ambient illumination and which requires neither polarization filters nor a dedicated light source.

It is another object of this invention to provide an integrated thin film flat panel display wherein which text or image data, once written, can be maintained with a negligible expenditure of power.

It is yet another object of this invention to provide a two-dimensional array of optical gates in a thin physical assembly in such a manner that the assembly may emulate a printed page addressable in real time.

It is another object of this invention to provide a surface or flat panel display wherein the resolution and data capacity of a printed page may be approximated.

It is yet another object of this invention to provide a printed page emulation which can be written to and erased repeatedly under the control of an electronic host computer or other electronic source of image or text data.

It is still a further object of this invention to provide a flat panel display sufficiently thin and requiring sufficiently low power that several such displays may be utilized together in a manner similar to pages in a loose leaf binder or a book and in which image or text, once written onto an array may be preserved while other data is written to other emulated pages.

It is another object of this invention to provide for an ensemble of flat panel displays to enable multiple page electronic documents which may be viewed and edited in real time.

It is still an additional object of this invention to provide an array of optical gates which, when assembled with associated electronics and power supply, constitutes a display that may be written to from a host data source, removed electrically from the data source and the display maintained.

It is yet a further object of this invention to provide an ensemble of printed page emulating flat panel displays to enable multi-page documents to be downloaded from digital on-line services or from a CD ROM to enable one to view the material much as one would a book.

It is still a further object of this invention to provide a display wherein each pixel datum is contained in the form of both the position of a physical entity and also as an electrical entity in such a manner that, following display of data and removal from the data source, the display may be maintained and a voltage signal made available externally allowing the display to be read electronically.

It is yet an additional object of this invention to provide an array of transmissive pellicle optical gates wherein the array may function as a light gate in a projection system.

SUMMARY OF THE INVENTION

In accordance to the present invention a two-dimensional array of pellicle optical gates is utilized for the display of electronically supplied data. Pixels of the display are modulated by causing pellicles to block or unblock optical paths, thus altering their visual appearance. Pellicles are positioned by means of voltages placed upon electrodes and once established, their positions may be maintained with a modest power expenditure. Thus a display might be removed from the data source and the data display retained. Voltages by which the display is maintained may be made available to an external monitor, allowing the displayed data to be read electronically.

Other objects and attainments together with a fuller understanding of the invention will become apparent and appreciated by referring to the following description and claims in conjunction with the accompanying drawings.

DESCRIPTION OF THE PREFERRED EMBODIMENT

Figure 1:
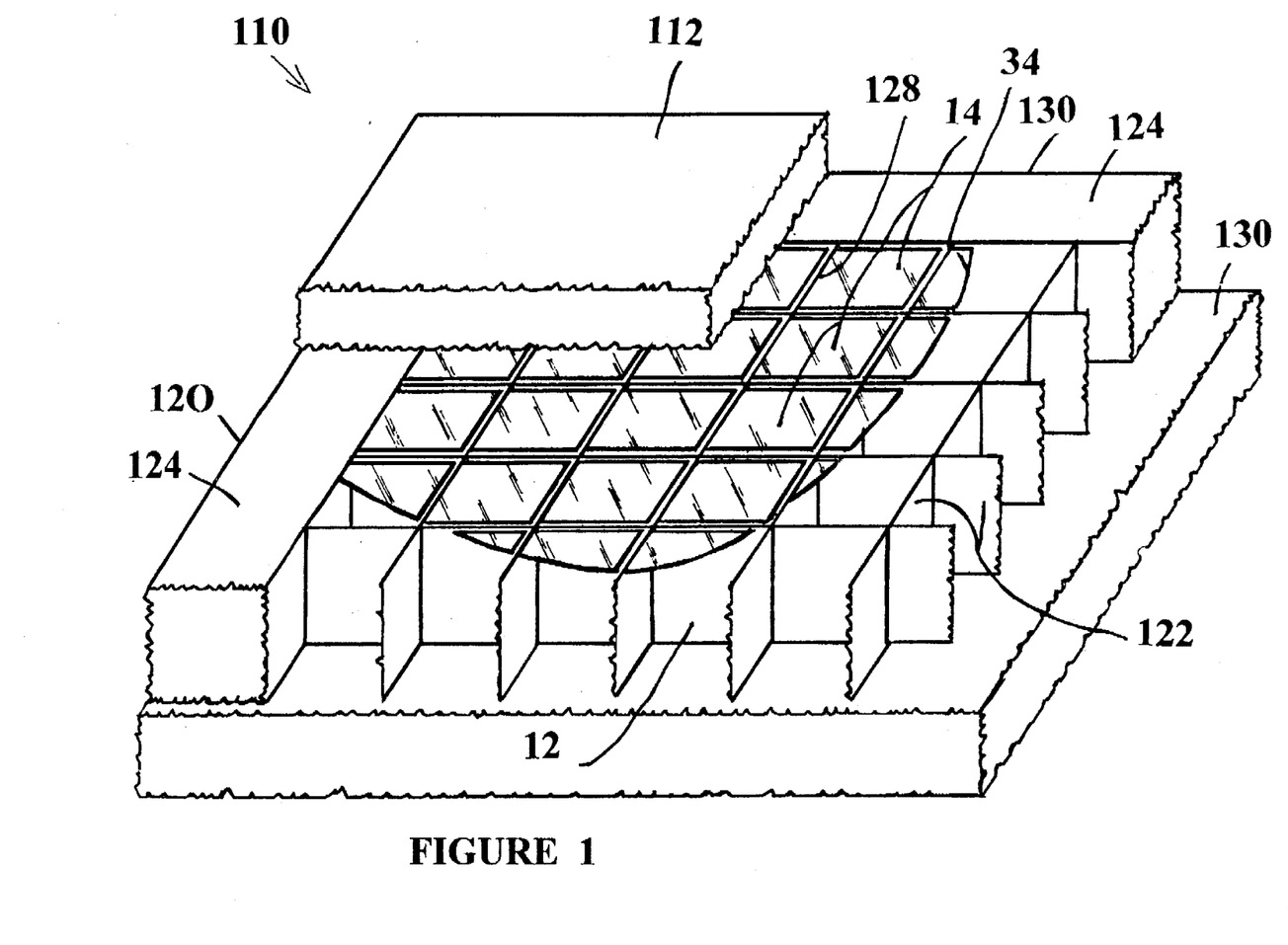
FIG. 1 illustrates a cutaway perspective of an array of pellicle optical gates formed according to the present invention.

Reference is now made to FIG. 1, wherein is illustrated a cutaway perspective of an assembled array 110 of pellicle optical gates. This assembly includes a top closure 112, a honeycomb structure 120, a plurality of pellicles 14, and a bottom enclosure 130, which may include embedded electronics 136 (not shown in FIG. 1).

The honeycomb structure 120 of FIG. 1 include walls 122, and an outer frame 124. A plurality of cavities 12 is formed by the walls 122 of the honeycomb 120 along with the bottom enclosure 130. Each of the cavities 12 formed by four walls 122 and the bottom closure 130 is rectangular and a rectangular pellicle 14 is attached along the top edge 128 of one of the walls 122. The cavity 12 provides room for the pellicle to swing between positions such that the cavity 12 may be covered or uncovered. The cavity 12 also provides room to contain the pellicle when the cavity 12 is uncovered. Gaps 34 provide sufficient clearance to allow the pellicle to move freely. The outer frame 124 provides mechanical strength to the honeycomb structure. The bottom enclosure 130 is attached along the bottom edges of the honeycomb walls 122 and the honeycomb frame 124 in such a manner as to create an integral structure. During this attachment process the honeycomb may still be held by a portion of a mold (not shown in FIG. 1) with which it is formed and which may serve as a tool for assembly. Individual pellicles 14 are formed from one large pellicle which is attached to the top of the pellicle attachment walls 128 and then cut, perhaps using a laser, along the other honeycomb walls 122, leaving clearance gaps 34. The top closure 112 is then attached to all four walls 122 of the honeycomb 120 further constraining the individual pellicles 14 along their attachment walls 128. The pellicles 14 are by these means sandwiched between the top enclosure 112 and the honeycomb 120 and are free to move between positions in a manner to cover or uncover the cavity. The entire structure of the assembly 110, including honeycomb 120 with its frame 124 along with the top closure 112 and the bottom closures 130 and including the pellicles 14 constitutes a robust honeycomb sandwich. Electronics and conducting traces (not shown in FIG. 1) are included in the assembly and the whole constitutes an integrated array of pellicle optical gates which may function as a flat panel display.

Figure 2:
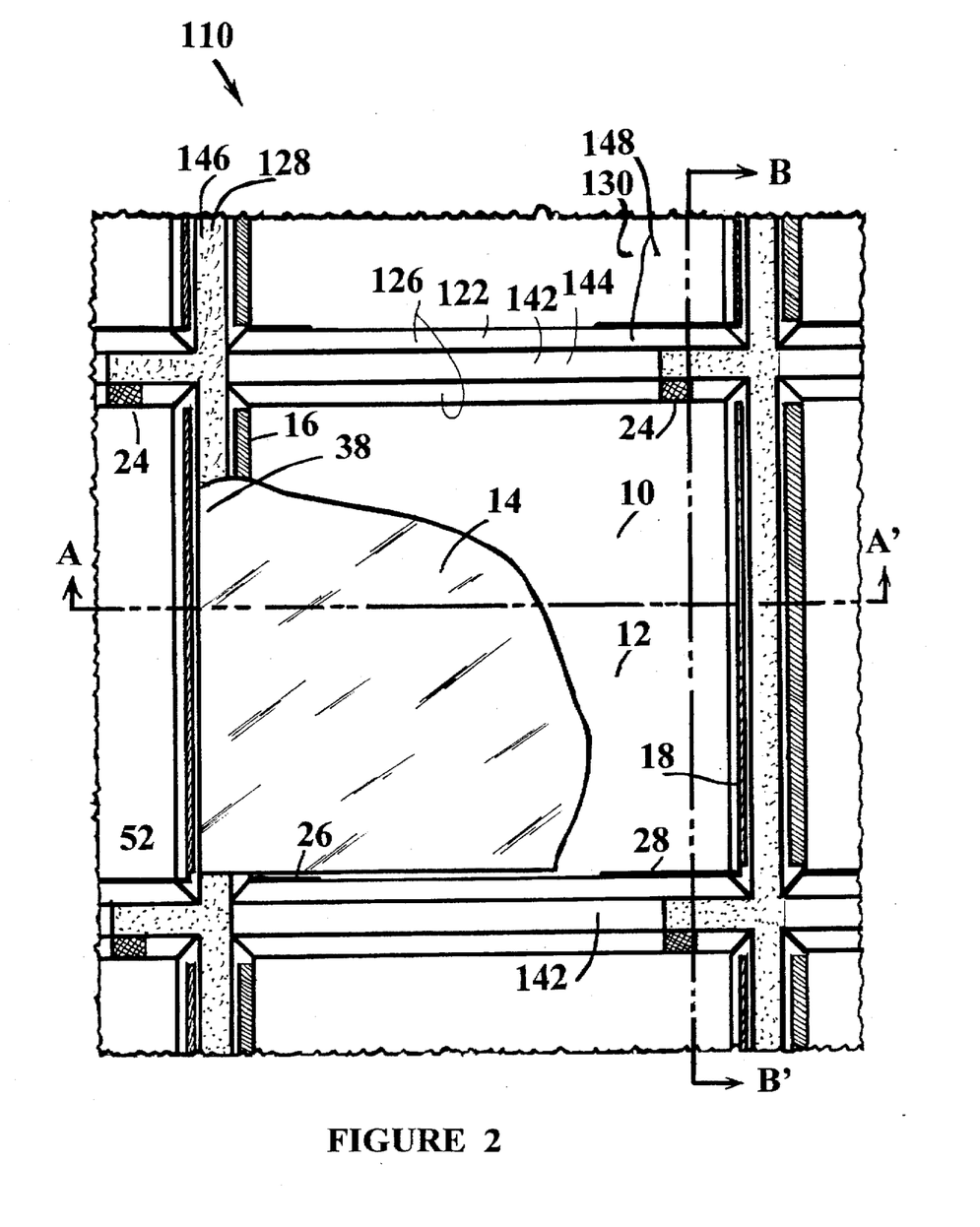
FIG. 2 illustrates a top view section of a typical pellicle optical gate of the array formed in accordance with the present invention.

FIG. 2 presents a top view section of a typical cavity 12 at the pellicle attachment plane showing a pellicle 14 in a partial cutaway view. Here the side walls 122 are indicated as if they had sloping surfaces 126 as might result from a draft angle in a mold. The pellicle 14 is attached along a hinge line 38 atop one wall edge 128 of the cavity 12 formed by the cavity walls 122. Along this edge the attachment of the pellicle 14 includes a conducting film 146, which may additionally serve as a sealant. The conducting film 146 is connected to the electronic assembly 136 (not shown in FIG. 2) embedded in the bottom closure 130 by a conductive path 24 which runs up one of those walls 122 which is perpendicular to the pellicle attachment edge 128. The pellicle is by this means connected electrically to the pellicle voltage source in the electronic assembly 136.

Also illustrated in FIG. 2 is a pellicle drive electrode 16 which occupies most of that cavity wall 122 just below the pellicle attachment edge 128. In each cavity 12 the pellicle drive electrode 16 is connected electrically to the pellicle drive electronics 136 (not shown in FIG. 2) by a path which includes the conducting trace 26. Indicated also in FIG. 2 is a grounded reference electrode 18, connected electrically to the electronics assembly 136 by a path which includes the conducting trace 28. The tops 142 of those cavity walls 122 which are perpendicular to the pellicle connection hinge 128 are provided with a nonconductive sealant 144 by means of which the top closure 112 is attached to the honeycomb 120. By means of the conductive sealant 146 and the nonconductive sealant 144 the honeycomb structure 120 and the top closure 112 are securely attached to each other with the pellicle 14 sandwiched between. The pellicle 14 is by these means attached on one cavity wall edge 128 and is free to be driven by voltages placed upon the electrodes 16 and 18 to cover and uncover the cavity.

The five surfaces of each cavity 12 formed by the four cavity walls 122 and the bottom closure 130 consists of a material 148 having a visual contrast, color, and/or other optical characteristic which is different than that of the pellicle 14. Thus by covering and uncovering any cavity 12 the visual appearance of the displayed pixel may be toggled between two values.

The assembly 120 of cavities 12, together with it's top closure 112 and it's bottom closure 130, may be of a size such that each cavity 12 will emulate a single pixel on a printed page, and specifically a laser printed page. Further, the assembly 120 may be of such a size that it emulates an entire a printed page.

Figure 3:
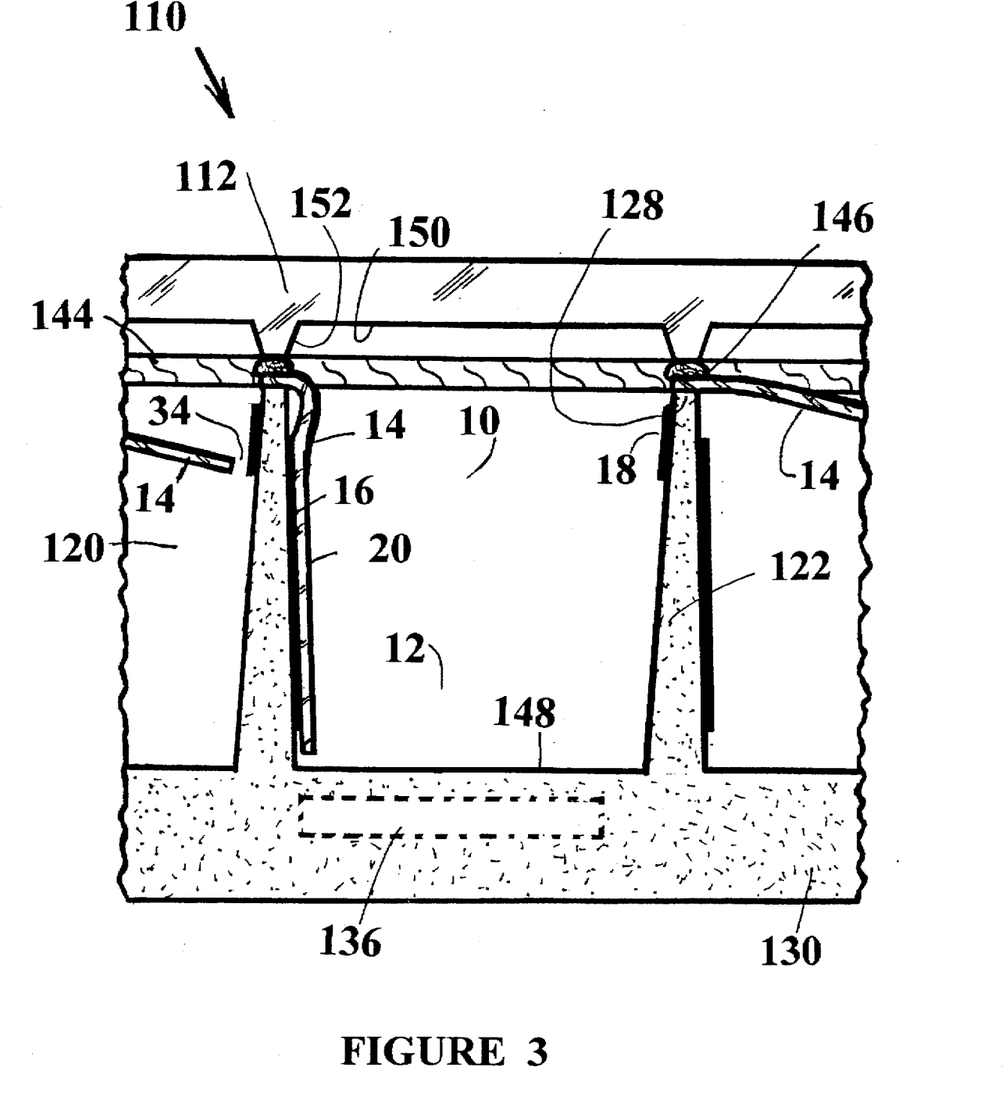
FIG. 3 is a schematic illustration of a cross-section view of an array pellicle optical gates formed in accordance with the present invention.

FIG. 3 presents a cross-sectional view of an assembly 110 of pellicle optical gates 10 constructed according to the present invention. This view corresponds to that cross-section labeled AA' in FIG. 2. In accordance with the present invention, individual cavities 12 are formed by four cavity walls 122 along with the bottom closure 130. To each such cavity 12 a pellicle 14 is attached to the top of one of the walls 128 by sealant 146 such that the pellicle 14 is sandwiched and sealed between the wall top 128 and the top enclosure 112. The top enclosure 112 is fabricated of optically transparent material and optionally may include shallow cavities 150, the walls 152 of which attach to corresponding walls 122 each cavity 12. The presence of these shallow cavities 150 provide the needed clearance for the motion of the pellicle 14. As shown in FIG. 3, each cavity 12 includes a ground or reference electrode 18 and a pellicle drive electrode 16 connected to the electronics assembly 136. These connections are made by conductive traces 28 and 26 respectively (not shown in FIG. 3 but indicated in FIG. 2). By means of voltages supplied to the electrodes 16 and 18 the pellicle is attracted to one or the other of these electrodes and the cavity may be toggled between covered and uncovered conditions. The visual appearances of any pellicle 14 and the internal surfaces of the associated cavity 12 are such that the displayed pixel toggles between two values as the cavity is covered or uncovered.

Optionally the pellicle drive electrode 16 may be protected from electrical discharge by means of an insulating over-coat 20. The top closure 112 is attached to the honeycomb 120 by means of a conductive sealant 146 on those particular walls 122 to which pellicles are attached and by non-conductive sealant 144 on the other walls 122. As indicated in FIG. 3, the bottom closure 130 may be integral with the honeycomb 120 and may contain an embedded electronics assembly 136.

Figure 4:
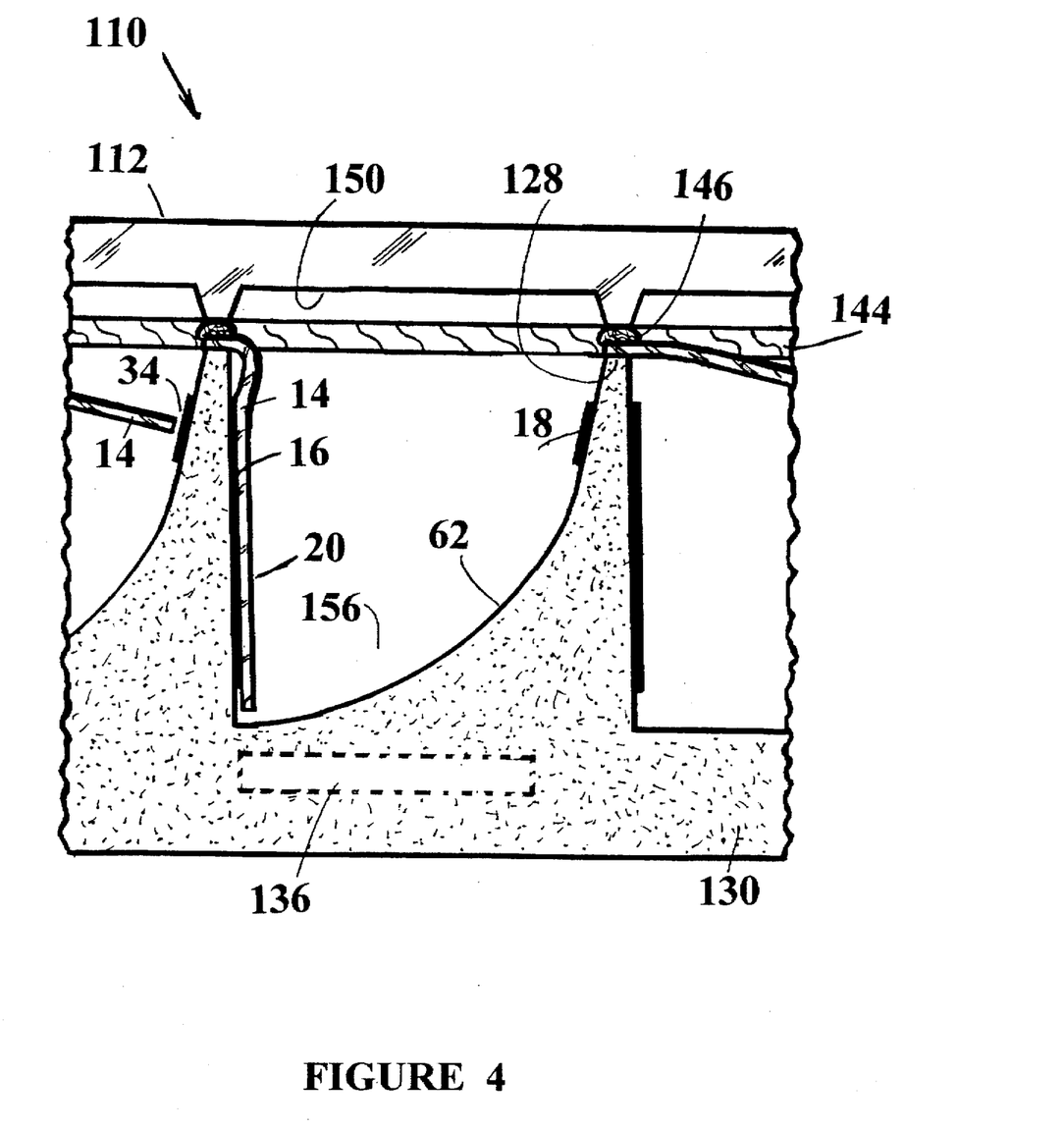
FIG. 4 is a schematic illustration of a cross-sectional view of another array of pellicle optical gates formed in accordance with the present invention.

FIG. 4 shows an alternate pellicle/cavity optical gate assembly illustrating an alternate honeycomb in which the cavities 156 form a partial cylinder. One wall 62 of this cavity 156 is made to conform to the arc of the pellicle edge as it toggles between its positions to cover and uncover the cavity. The optical aperture and the pellicle are both rectangular. Other features of FIG. 4 are similar to those of FIG. 3 and are described by the descriptions given for FIG. 3.

Figure 5:
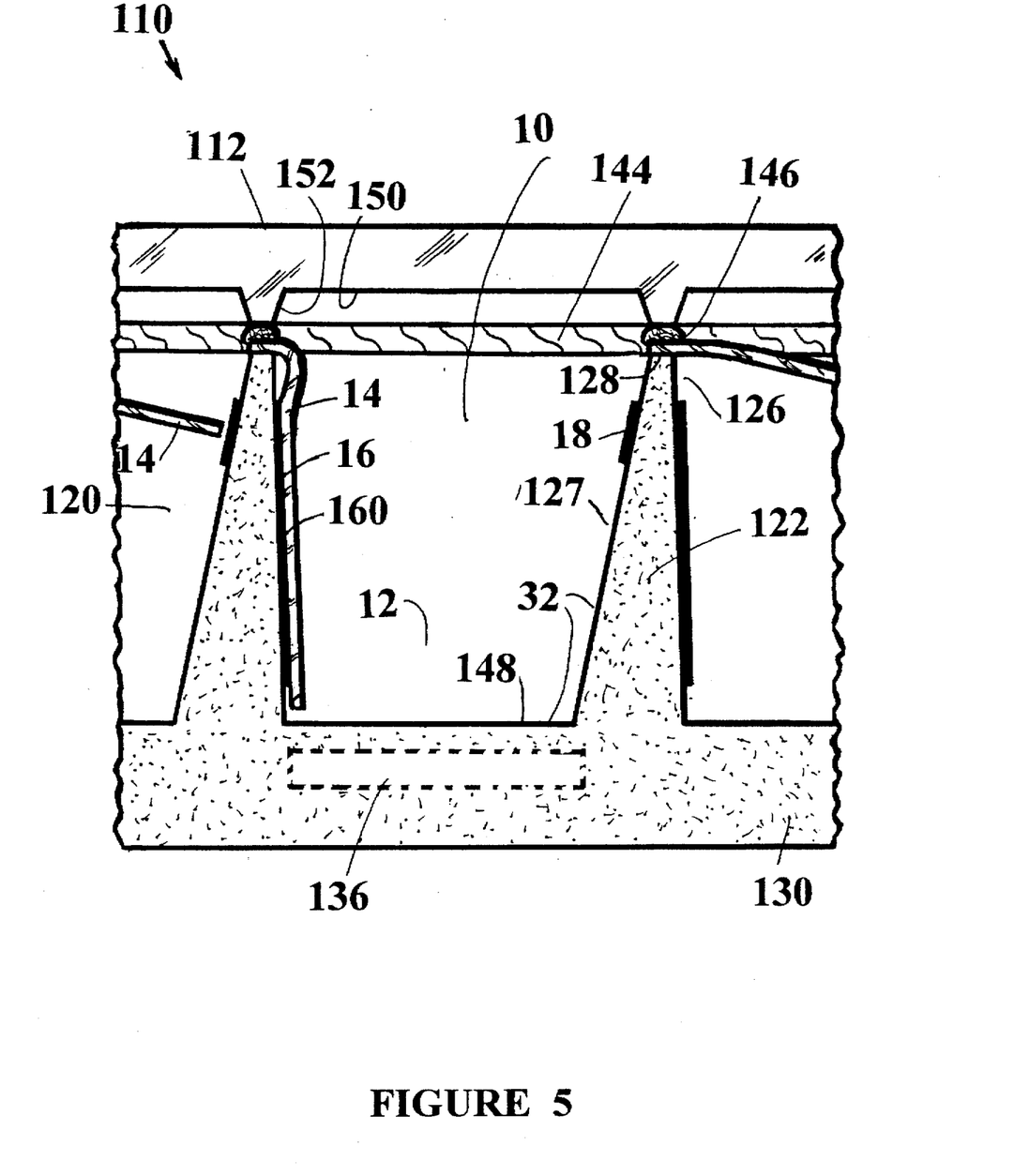
FIG. 5 illustrates a cross-sectional view of still another array of pellicle optical gates formed in accordance with the present invention.

FIG. 5 illustrates yet a second alternate honeycomb 120 for a pellicle/cavity optical gate formed in accordance with the present invention. This illustration also corresponds to the section AA' in FIG. 2. In the approach illustrated in FIG. 5 the needed insulation between the pellicle 14 and its' drive electrode 16 is provided an insulator 160 on the pellicle 14 lower surface, which is the surface which may contact the electrode when the pellicle is so positioned as to uncover the cavity 12. In addition, the surface of that particular honeycomb wall 122 which lies opposite the pellicle drive electrode 16 exhibits an increased slope 127 relative to the other slopes 126 of the walls 122. The resulting increased wall width provides an increased strength for the honeycomb. The slopes 126 on the other three wall 122 surfaces are held to the minimum needed to provide a mold release draft angle. By these means the honeycomb structure is strengthened without the sacrifice of optical aperture of the cavity 12. The other features of FIG. 5 are similar to, and are as described by those for FIG. 3.

Figure 6:
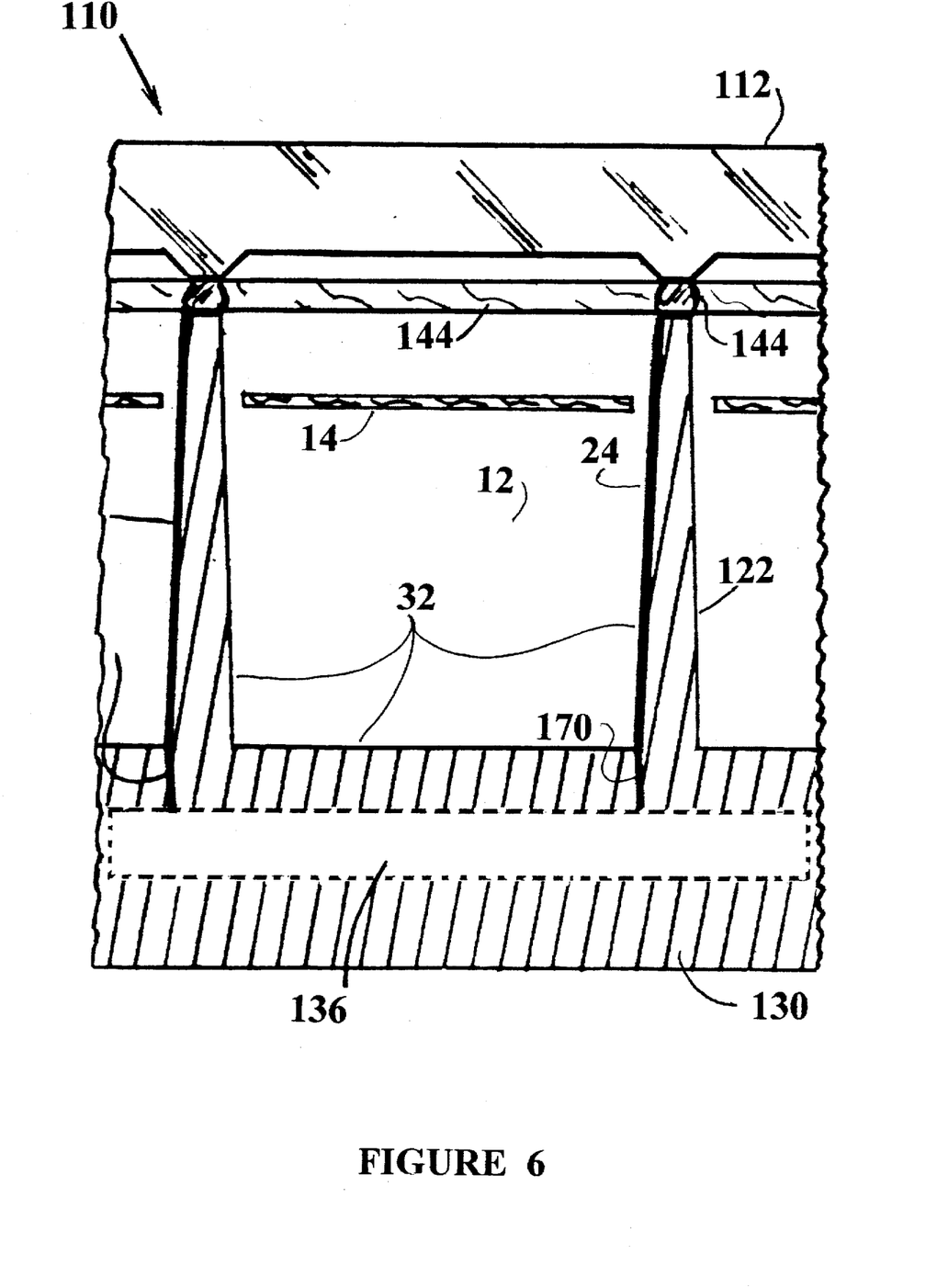
FIG. 6 illustrates a cross-sectional view of an array of pellicle optical gates formed in accordance with the present invention in a plane orthogonal to the views in FIGS. 3, 4, and 5.

FIG. 6 shows a different cross-sectional view of the pellicle/cavity ensemble of FIG. 2. In this case the cross-section corresponds to the section labeled BB' in FIG. 2. In FIG. 6 an electronic sub assembly 136 is shown embedded within the bottom enclosure 130. Connections 26 and 28 (not shown in FIG. 6) to the electrodes 16 and 18 (also not shown) in the cavity 12 are typified by the pellicle connection, a portion 24 of which is shown in FIG. 6. The full connection includes the conducting trace 24 and the conducting sealant 146 as shown in FIG. 2 but not shown in FIG. 6. This connection 24 is extended by a conductive trace 170 which is shown embedded within the lower enclosure 130 and may be formed integrally with the lower enclosure 130. Thus the electronics 136 is electrically connected to the pellicle 14 by paths 170, 166 (not shown in FIG. 6 but shown in FIG. 7), 24, and (146 not shown in FIG. 6). The other features of the cross-sectional view shown in FIG. 6 are as described earlier in connection with FIG. 2.

Figures 7, 7A:
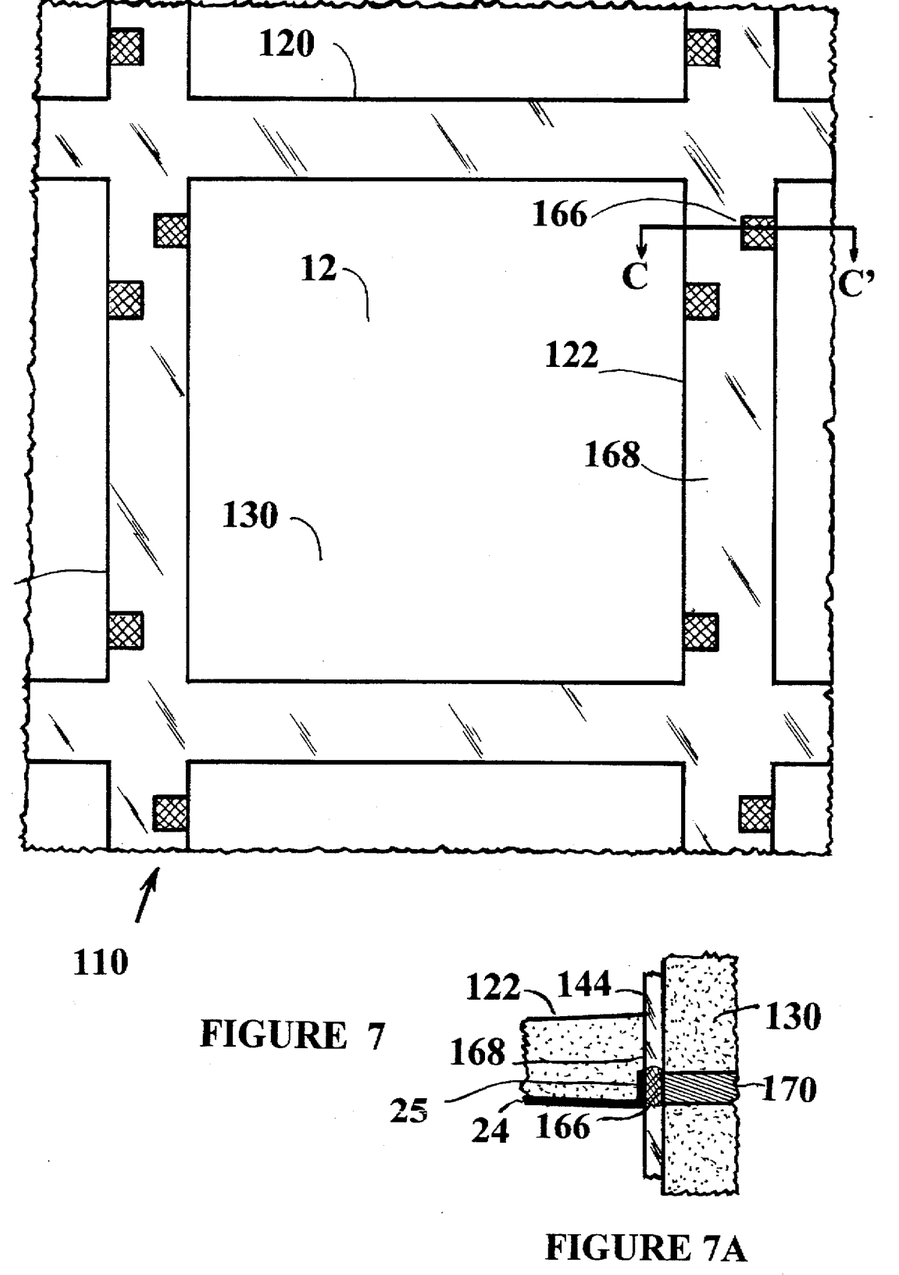
FIG. 7 illustrates another top view of a typical pellicle optical gate formed in accordance with the present invention.
FIG. 7a illustrates a cross-selection of a honeycomb wall along line C-C' of FIG. 7.

FIGS. 7 shows an additional top view of a typical cavity 12 of the assembly of pellicle/cavity optical gates 110. In this figure the view is at the bottom of the honeycomb 120 where it is in contact with the lower enclosure 130, and where the honeycomb walls 122 are their widest 168 as a result of the sloping wall surfaces 126 (not shown in FIG. 7). The inset, FIG. 7a, typifies the electrical connection from the electronics assembly 136 (not shown in FIG. 7a) through the seal to the pellicle connection 24. A conductive trace 170 which may be formed integrally with the lower enclosure 130 terminates in a solder bump 166, which may be indium. This solder bump is then forcibly contacted with the lower portion of the pellicle connection 24 implemented as a conducting trace on one of the cavity walls 122, and which includes an extension 25 on the bottom of the wall 122 specifically to implement the connection. Electrical connections to other traces on the cavity 12 walls 122 are similar. By the means shown in FIGS. 7 and 7a a voltage from the electronics assembly 136 is conducted from the electronics 136 to the pellicle 14. Similar paths (not shown in FIG. 7) conduct voltages from the electronics assembly 136 to the pellicle drive electrode 16, and the ground or reference electrode 18 in the cavity 12.

Figure 8:
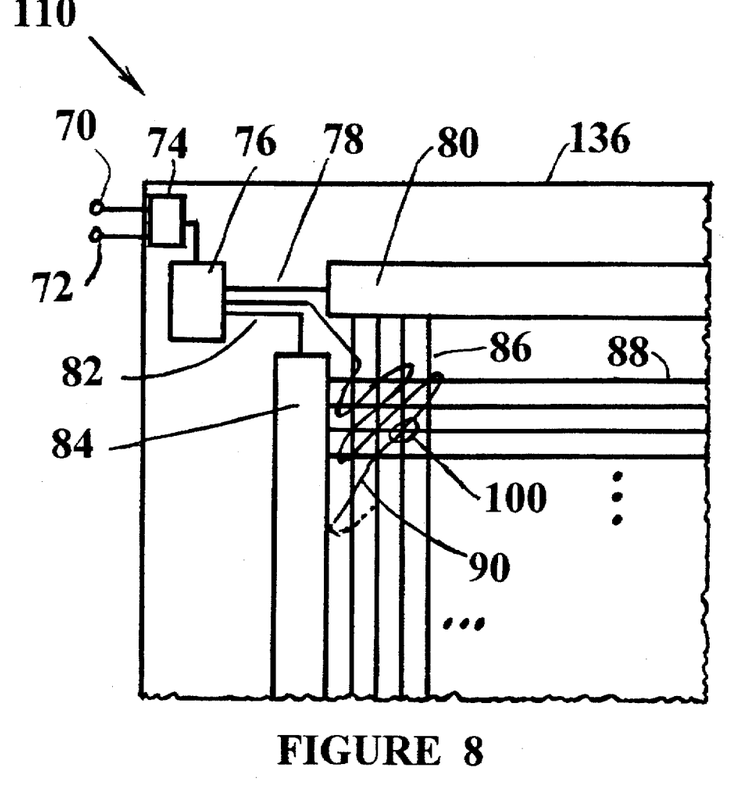
FIG. 8 illustrates the overall approach for driving the array of pellicle/gates with electronic signals.

FIG. 8 illustrates in block diagram form the electronics assembly 136 associated with the array 110 of pellicle/cavity gates 10 formed in accordance with the present invention. These electronics may, optionally be embedded within the lower enclosure 130. This electronics assembly 136 includes a connector 74 for connection to a remote data source. The connection means 74 includes connections 70 for electric power, and connections 72 for signal voltages for reference, synchronization and data. In the array 110 pellicle optical gates 10 are distributed in a two-dimensional matrix which may be addressed by row and column. From signal voltages supplied through the connection 72 a row address 82 and a column address 78 are developed by electronic circuitry 76 which may include counters and other state of the art electronics. From the column address 78 one of a set of column selection wires 86 is selected by means of column selection electronics 80. Similarly, from the row address 82 one of a set of row selection wires 88 is selected by means of row selection electronics 84. Such selection is typical of state of the art electronic memory address electronics. The electronic signal to be displayed, or to be read from the display, is made available on a signal lead 90 which is available to each and every optical gate of the array. One particular gate is selected by an intersection of one of the row wires 88 and one of the column wires 86. The signal lead 90 may be tri-state typical of those commonly utilized in computer buss electronics. Such a tri-state signal lead will allow signals to be provided to position the pellicle 14, and will also allow the voltage by which a pellicle position is maintained to be monitored and made available to a remote device by means of the electronics 76 and the signal connections 72, contained in connector 74. the intersection of one column lead with one row lead selects one electronics node 100, which actually supplies and/or receives signals as addressed by an address row 88 and a address column 86. The performance of this node 100 is more particularly described with reference to FIG. 9.

Figure 9:
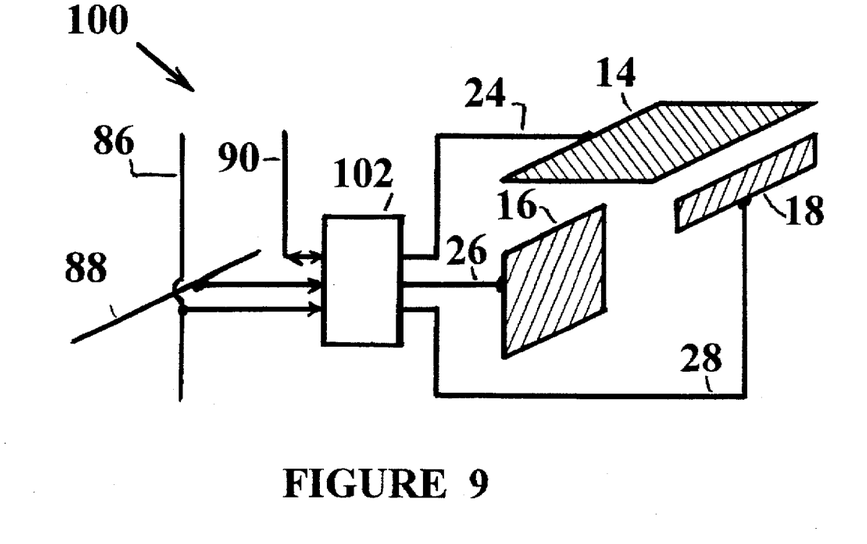
FIG. 9 illustrates the electronics required for driving the pellicle in individual gates.

FIG. 9 illustrates electronics typical of each node 100 at the intersection of a row 88 and a column 86 and associated with a specific pellicle/cavity optical gate 10 (not shown in FIG. 9) of the array 110. A voltage present on a specific column lead 86 in conjunction with a voltage on a specific row lead 88 activates the node 100. When thus enabled the node electronics block 102 couples data between the pellicle 14 and the data lead 90. When data is to be received by the display pellicle positioning voltages are generated and held by the electronics block 102 until the node is next enabled. This signal voltage is supplied to the pellicle drive electrode 16 by means of the pellicle drive connection 26. The pellicle is then positioned according to the drive voltage and the visual appearance of the selected pellicle optical gate responds accordingly. The inclusion of an auxiliary power source by means of the connector 72 will allow the display to be removed from the data source while maintaining the data displayed. Reconnection to an external electronic device which supplies power,along with address and synchronization signals will allow the displayed data to be derived as a data train at connector 74 and 72 and by this means read into the external device. When pellicle position data is to be read from a selected node 100 then the pellicle drive voltage generated by electronics 102 and maintained on lead 26 and electrode 16 is made available to the data lead 90 and coupled to the connector 74 by means of the electronics 102. Electronic circuitry in the node 100 may be similar to state-of-the-art electronics commonly utilized in CMOS static random access memory, or SRAM, and is well known in the industry. The power required to both position and hold the pellicle to one of its' two possible states may be typical of the electric power to set and hold a single data bit in a typical CMOS sram element. Thus nearly negligible electrical power is required and the auxiliary power supply might be constructed as a thin film structure integral with the display 110.

By the above means the array of pellicle optical gates as described can develop pixel by the pixel visual appearance representative of an electronic image which is to be displayed. The pixel visual appearances will be developed as pellicle optical gates are selected one-by-one as a result of signals supplied from a digital image or text source. Once the pixel pattern is developed over the array it can be maintained with a minimum power drain. Thus with the inclusion of a small auxiliary power supply the array can be removed from the signal source for review at ones convenience. Additionally, it may be connected to another digital host and the displayed image pattern transcribed to the new host.

By way of illustration, the preferred embodiment may emulate the array of pixels as produced on a page of paper by a representative laser printer. Thus, for example the display might constitute a 300×300 pixel per inch flat panel display. As such each pellicle optical gate might include a whitened, cubical cavity, 12, with the gates having a pitch of 0.085 mm. in both dimensions, along with a square blackened pellicle, 14, consisting of a 0.004 mm thick nitrocellulose substrate overcoated with a thin film of optically transmissive, electrically conductive polymer, such as polyaniline, and having an edge length of 0.080 mm. in such a case the gaps, 34, between the pellicle, 14, and the cavity, 12, will be 0.005 mm. Such a pellicle optical gate can toggle between essentially black to essentially white under electronic control. About 11% of any incident flux, 40, will miss the pellicle, 14, as it enters the cavity. Of this amount only about 11% will miss the pellicle, 14, on the outbound path. The resultant net reflectivity of a pellicle optical gate with the cavity covered will then be only about 1.3%, and the pellicle/cavity combination will appear black. If, however the cavity is uncovered by the pellicle then the pellicle optical gate will appear white.

Voltage and field levels must be set relative to the electric break down of air. The gap length for a needle-point spark gap is about 4.2 mm for 5,000 volts. Electric fields, "E", in air must therefore be kept below about 1.0 volt per 0.001 mm. The electric flux density in air will thus be less than about $D=(E)(e)=8.85E-6$ coulombs per sq. meter., where "e" is the permittivity of free space 8.85E-12 farad/meter. Total charge over the pellicle area will thus be less than about 8.85E-6 coulombs/sq. meter X $(0.08E-3\ meter)^2$, or less than about 5.7E-14 coulombs.

Within the pellicle insulator, 20, the field will be reduced according to the relative permittivity of the insulation medium, on the order of 2.5. With the field in air limited to 1 volt per 0.001 mm the field within the insulator, 20, may thus be of the order of 0.4 volt per 0.001 mm. A convenient voltage level is 3.0 volts achieved by a pair of 1.5 volt batteries. This voltage level is commonly used in integrated circuit technology, and battery technology at 1.5 volts is mature. The net insulation thickness may thus be on the order of (3.0 volt)/(400 volt-per-mm) or about 0.0075 mm. Of this the pellicle may contribute 0.004 mm, leaving 0.0035 mm as the thickness of the electrode insulator 20.

Once the pellicles have positioned in accordance with electronic signals from an electronic image source to achieve a data display then the power required to maintain their positions, and hence the display, may be quite small. Each pellicle is held in position by a voltage which may be stored by a capacitance of small value. The voltage level, storage capacitance, and power drain needed to hold a single pellicle position may be typical of similar values needed to maintain a single static RAM element in a given digital state.

Each pellicle optical gate thickness may be on the order of 0.15 mm., including top and bottom enclosures, pellicle, and cavity. When an array of pellicle optical gates is utilized as an integral flat panel display the thickness of the display will be on this same order. The display may include an active area of 8×10 inches in an overall format of 8.5×11 inches. Having a pixel pitch of, typically 300×300 per inch the resulting flat panel display is representative of page of data as printed by a laser printer.

In view of the very low power needs along with the thinness of such an array, many such arrays can be stacked similar to pages in a book. Once written upon, the ensemble of displays can be removed from the data source and the displayed data maintained with a very low expenditure of power, which might be provided by a state of the art thin film battery. With the inclusion of a pellicle monitoring facility the displays of the ensemble may be read by an electronic device capable of supplying synchronization and address signals. Such an ensemble of displays may be written to and read from repeatedly when connected to electronic devices capable of producing or receiving image data.

While the invention has been describes in conjunction with specific embodiments, it is evident to those skilled in the art that many alternatives, modifications, and variations will be apparent in light of the foregoing description. Accordingly, the invention is intended to embrace all such alternatives, modifications and variations as fall within the spirit and scope of the appended claims.

What is claimed is:

1. A display device comprising
a plurality of individually controllable optical gates in an array wherein each individual optical gate is comprised of a single pellicle segment together with a means to adjust the position of the said pellicle segment whereby the visual appearance of the said individual optical gate is altered and wherein the visual appearance of the plurality of optical gates of which the display device is comprised constitutes a visual display.

2. The display device of claim 1 wherein an individual pellicle segment of each of the plurality of optical gates is fixed along a hinge line about which the said pellicle segment is free to move and further comprising a set of electrodes associated with each of the said plurality of optical gates and wherein the position of each of the said pellicle segments is separate adjustable by voltages placed upon the set of electrodes associated with each said optical gate and its pellicle segment and wherein the said pellicle segment is driven by electrical forces to either of two positions whereby the visual appearance of the optical gate is altered.

3. The display device of claim 2 wherein is included interconnection means whereby each of the plurality often dual optical gates, of which the display device is comprised, receives electrical power, as well as synchronization, address and data signals and wherein is also included electronic means to generate pellicle segment drive voltages in accordance with the said received signals, and wherein is further included interconnection means to apply these drive voltages to the electrode set associated with each individual pellicle optical gate whereby each of the pellicle segment is positioned whereby the received data are displayed on the plurality of individual pellicle optical gates which comprise the display device.

4. The display device of claim 3 wherein the said display device is configured to function as an integrated electronic display under the control of an electronic host device.

5. The display device of claim 4 wherein the said array is two dimensional comprising one or more rows and one or more columns.

6. The display device of claim 4 wherein the plurality of optical gates of which the display device is comprised, taken together, comprise a flat panel display.

7. The display device of claim 3 wherein individual pellicle optical gates of the said plurality of optical gates have a size typical of the pixel size of a representative laser printer and wherein the individual gates of the said array are spaced within the array with a spacing typical of the pixel spacing of the representative laser printer.

8. The display device of claim 7 in a thin format wherein the display device emulates a laser printed output page.

9. A plurality of the display devices of claim 8 configured to emulate a book having a plurality of pages.

10. The display device of claim 7 configured to emulate a desk pad.

11. The display device of claim 3 wherein the said electronic means associated with each of the said plurality of pellicle optical gates further includes capacitor means, together with electronic switching means, whereby the pellicle drive voltage is maintained for a period of time following removal of the supplied synchronization, address and signal voltages, whereby the position of the pellicle segment is maintained.

12. The display device of claim 11 wherein the said interconnection means associated with each of the plurality of individual optical further includes bi-directional switching circuitry, together with switching control means, whereby the pellicle segment drive voltage being maintained by the said capacitor means is, optionally, made available to an external device.

13. The display device of claim 2 further comprising an optical path associated with each of the plurally of optical gates and wherein the said pellicle optical gate comprises a transparent top closure, which is common to all gates of the array and, a pellicle segment which is positionable by electric fields and, a set of pellicle positioning electrodes whereby applied voltages will generate electric fields which will position the pellicle segment to cover or uncover the optical path and, a bottom closure which is common to all gates of the array of pellicle optical gates and, electronics wherein external signals and power are accepted and wherein pellicle segment control voltages are generated and, connectivity means whereby voltages generated by the said electronics is connected to the positioning electrode set.

14. The display device of claim 13 wherein the bottom closure is fabricated as a structure which includes transistor electronics along with interconnection means and, wherein walls with integral electrodes and connectivity traces are fabricated as a honeycomb structure whereby a honeycomb cell is defined for each optical gate and wherein the said honeycomb structure is attached to the bottom closure and connectivity established whereby voltages generated by the said electronics are connected to the positioning electrode set and, wherein individual pellicle segments of the array are first fabricated as a single monolithic pellicle which is then attached along one top wall of each honeycomb cell and cut along the other walls of each honeycomb cell to define the pellicle segments and to allow freedom of motion of the individual pellicle segments so defined and, wherein a transparent top closure is attached to the top of the said walls of the honeycomb structure.

15. The display device of claim 14 wherein the said array is two dimensional comprising one or more rows and one or more columns.

16. The display device of claim 14 wherein the assembled structure comprises a thin film, flat panel display.

17. The display device of claim 14 wherein the bottom closure and walls are reflective and wherein the optical reflectivity of each pellicle optical gate is modulated by the position of its pellicle segment.

18. The display device of claim 17 wherein the said array is two-dimensional comprising one or more rows and one or more columns.

19. The display device of claim 13 wherein the bottom closure is transparent and wherein the optical transmissivity of each pellicle optical gate is modulated by its pellicle position.

* * * * *